June 23, 1953  A. E. LE VAN  2,642,747
AIR VOLUME REGULATOR
Filed Dec. 4, 1946  2 Sheets-Sheet 1

*INVENTOR*
AMBROSE E. LE VAN
BY Bruno C. Lechler
*ATTORNEY*

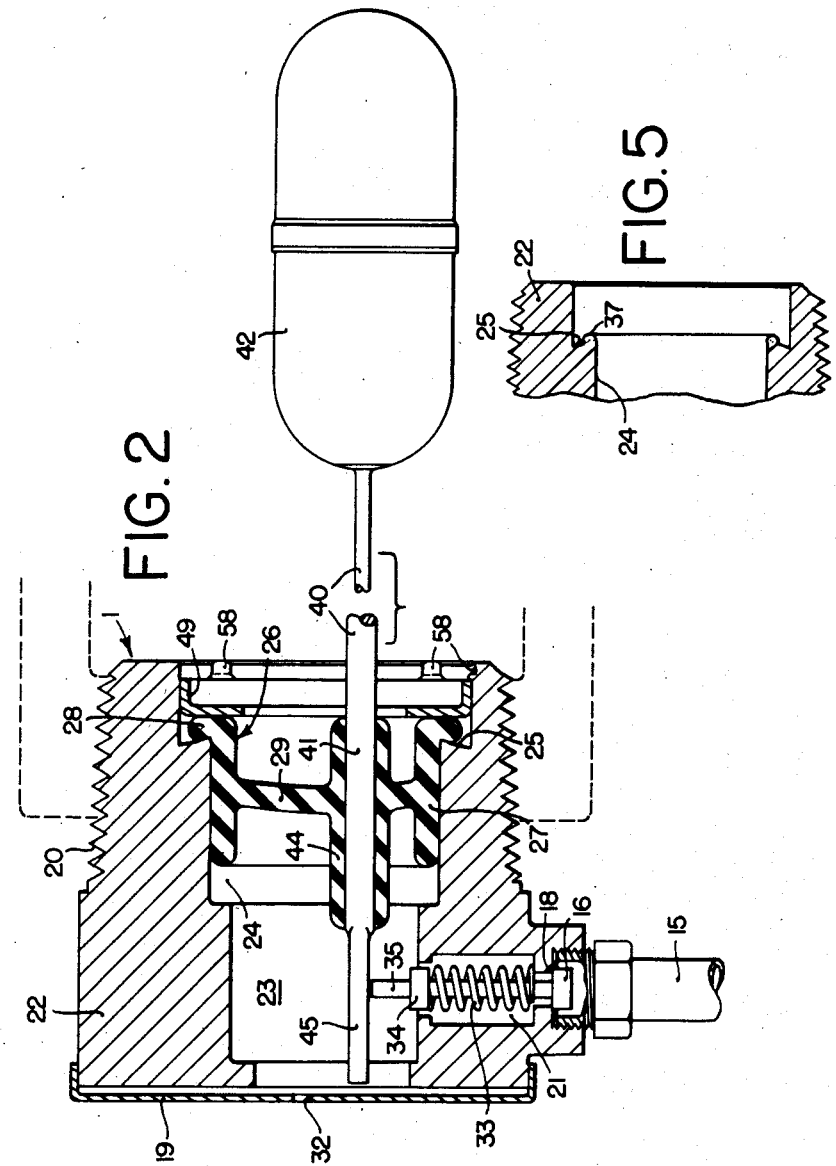

Patented June 23, 1953

2,642,747

UNITED STATES PATENT OFFICE 2,642,747

AIR VOLUME REGULATOR

Ambrose E. Le Van, Sellersville, Pa., assignor to American Machine and Metals, Inc., New York, N. Y., a corporation of Delaware Application December 4, 1946, Serial No. 714,114

The portion of the term of the patent subsequent to August 26, 1969, has been disclaimed 5 Claims. (Cl. 74—18.1)

The invention relates to an improved regulator which automatically controls the addition of air to a pneumatic storage tank used in a water system to discharge water stored in the tank during the period when the pump is not in operation.

More specifically, the invention relates to an improved assembly which may be inserted in the wall of such a water storage tank and which is adapted to control the opening and closing of an air valve by the level of the water in the tank distinguished by a flexible mounting for the stem of the float in the tank which responds to the level of the water, the stem expanding outside of the tank and controlling an air valve which admits air to the water pump of the system at the proper time.

Air regulators mounted in the side of the tank of a water system and designed to open a valve in an air line which allows the water pump to draw in a small amount of air at each stroke when the air pocket in the water storage tank has decreased below the normal volume are well known. The stem of the float commonly passes through a flexible diaphragm. Frequently the stem of the float carries pivot points which are supported directly behind the diaphragm so that the diaphragm functions only as a seal to prevent the water escaping from the tank around the float supporting rod. Thus the stem is supported in a manner permitting it to move about a pivot located near the diaphragm in response to any change in the level in the tank.

It has been proposed in the past to place a flexible disc inside the air control housing and clamp it around its rim, to pass the rod through the diaphragm and to clamp the rod in place on the diaphragm by placing nuts and washers on the rod adapted to clamp the diaphragm between opposing washers. That arrangement imposed severe stresses upon the diaphragm at the outer edge of the disc which is rigidly clamped in a transverse plane and also at the edges of the washers which held a portion of the center of the diaphragm rigid, creating points of intensive local flexure along the edges of these washers. Since such installations are required to operate over long periods of time without inspections or replacements diaphragm failure must be avoided.

The flexible diaphragm must resist the pressure in the tank and therefore tends to be distorted by that pressure.

Efforts to increase the life of the diaphragm by making it heavier or more rigid involved a loss of sensitivity. There are practical limitations to the size of the float which is usually made small enough to be inserted through the opening into which the control fitting is screwed. This prevents offsetting the loss of sensitivity of the diaphragm by providing a larger float and thus a larger impelling force.

It has been discovered that the diaphragm may be made quite thin if its edges are not attached directly in any form of clamping device but are attached to a cylindrical rim or sleeve of flexible material. This permits the entire diaphragm to flex and transfers the stresses along the rim into this cylindrical sleeve. The cylindrical sleeve may be provided with an outward flange some distance away from the plane of the diaphragm and this may be firmly clamped against a seat in the housing to prevent leakage without imposing stresses upon the diaphragm. The seat of the housing may be provided with a bead along its edge, or the seat may be conical and the outstanding flange may be clamped so tightly against this bead or this inner edge of the conical flange as to compress the rubber and leave a permanent set without injury to the functioning of the diaphragm since the diaphragm is not directly adjacent to the clamped flange.

It has further been discovered that the diaphragm may be provided with a boss on one or both sides and the rod run through this boss and the diaphragm. In this manner the hole through which the rod passes can be provided with a much larger contact than the thickness of the flange can provide. This permits molding the diaphragm about the rod, or vulcanizing the rod into the molded piece. Since the boss is integral with the diaphragm and somewhat flexible we escape the disadvantage of a concentrated flexing action along the edge of a clamping washer as has been experienced in the past.

It has been discovered that the diaphragm may be made quite thin, allowing great flexibility, if it is reinforced by a rib molded integrally with the diaphragm. The boss previously described may be merged into this rib. In using such a diaphragm the entire diaphragm may be distorted outward by the pressure of the water in the tank, but the rod tends to pivot about the rib as an axis and this rib gradually disperses throughout the diaphragm the stresses created by the pivoting of the rod.

Finally, it has been discovered that by placing this rib on a horizontal chord located well below the center of the diaphragm a much better performance is secured.

In pumping systems where the pneumatic storage tank is used an electric motor driven pump is usually employed. The system is provided with pressure controls which start the motor and pump when the pressure in the tank falls. This pressure drop results from the expansion of the air lowering the level of the water in the tank. When the pump runs, the pressure builds up and when the pressure reaches its maximum value the pump is automatically shut down. Practically the only time the water level can rise above the point at which air is to be admitted to the tank is when the pressure approaches its maximum value.

The diaphragm "breathes"; that is, it bulges out further every time the pressure which rises while the pump is running approaches the maximum and recedes every time the pressure decreases while the pump is not running and water is drawn out. Since the increase of pressure and the rise of water in the tank are always coincident the "breathing" of a sensitive diaphragm can be used to assist the float. To this end the rib on the diaphragm is placed well below the center of the diaphragm so that more of the bulge of the diaphragm incident to breathing is above the rib than below it. Thus, as the bulge increases, the rib is tilted in the same direction in which the rising float must tilt the rib. In this manner a longer range of float rod movement is secured and a more positive opening of the air valves than is usual where the float alone actuates the air valve.

An object of the invention is to provide a method of actuating an air valve in a water storage system to replenish the air volume in the tank wherein advantage is taken of the increase in the distortion of the diaphragm just before the pump cuts out to augment the moment exerted by the water through the float to actuate an air valve outside the tank.

Another object of the invention is to provide a flexible diaphragm which responds both to the pressure in the tank and to the position of the float wherein the rim of the diaphragm is supported by a cylindrical flexible rim, the outer edge of the rim being anchored to the rigid housing.

Another object of the invention is to provide a flexible diaphragm having a rib integral therewith which provides a fulcrum for a rod carrying a float.

Another object of the invention is to provide a flexible circular diaphragm having a rib integral with the diaphragm along a chord of the diaphragm which is located below the center of the diaphragm.

Another object of the invention is to provide a molded unit of flexible material comprising a flexible diaphragm, a flexible rim around the edge of the diaphragm, an attachment flange extending outwardly from the rim in a plane distant from that of the diaphragm, a boss extending normal to the face of the diaphragm, an opening extending through the boss and the diaphragm, a rigid stem firmly fastened into said opening.

Another object of the invention is to provide a molded unit of flexible material comprising a flexible diaphragm, a flexible rim around the edge of the diaphragm, an attachment flange extending outwardly from the rim in a plane distant from that of the diaphragm, a rib integral with the diaphragm, an opening extending through the rib and the diaphragm, a rigid stem firmly fastened into said opening and adapted to pivot about said rib.

Another object of the invention is to provide in an air volume regulator having a housing containing a seat, a molded unit of flexible material dividing the interior of the housing into two portions adapted to be held against said seat by the pressure in the tank to which the housing is attached, and a metal retaining cup anchored in the housing forcing said molded unit against the seat to prevent leakage from the tank.

Fig. 2 is a vertical section to an enlarged scale of the air volume regulator attached to the tank in Fig. 1.

Fig. 5 is a vertical section of a part of a modified form of part 22.

Figure 1:
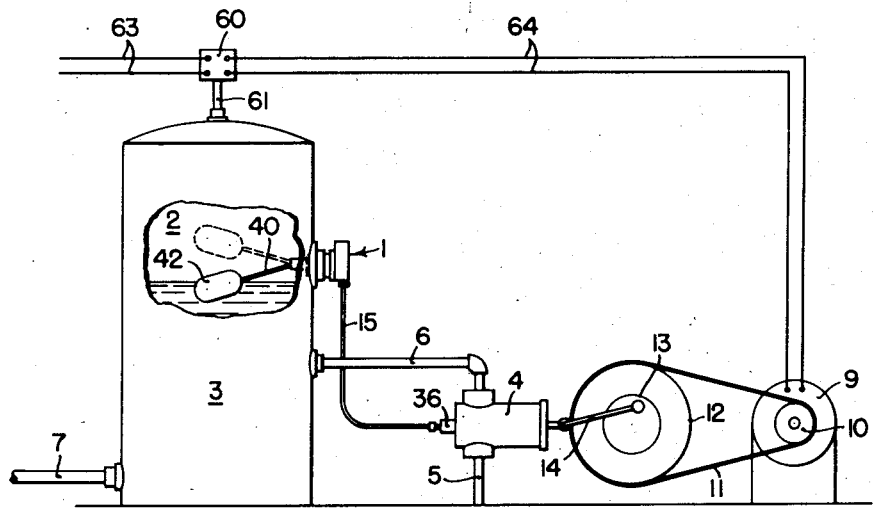
Fig. 1 is a vertical elevation of a motor driven pump and water storage tank equipped with the improved air volume regulator.

1 indicates, generally, an automatic air volume regulator. This air regulator is screwed into a flange attached to the wall of the storage tank 3 of a water system.

A reciprocating pump 4 draws water from a well or the like through inlet pipe 5 and discharges the water mixed at certain times with air through pipe 6 into a tank 3. Water is delivered from the tank to the system through delivery pipe 7. Pump 4 is usually driven by an electric motor 9 having a pulley 10 which drives a belt 11 running over the larger pulley, diagrammatically shown at 12. This pulley carries an eccentric pin 13 which drives the plunger of the pump 4 through a connecting rod 14.

As the level of the water in the tank 3 rises above the inlet pipe 6, air is trapped and compressed in space 2. The automatic air volume air regulator 1 comprises a body 22 which is threaded at 20 for installation in the flange attached to the tank wall. The inside of the body 22 has a central passage 23 extending from one end of the body to the other.

A passage 21 extends through the wall of the body 22 joining with passage 23. Inside of passage 23 is a machine cylindrical surface 24. At the end of the cylindrical surface toward space 3 is a seat 25. This seat is faced at an angle so that the angle between the seat 25 and the surface 24 is less than a right angle. The left hand part of the passage may be closed by a cap 19. This cap has a hole 32 permitting air to pass freely into that portion of the passage 23. The passage 23 is divided into two parts by a grommet generally indicated as 26.

Passage 21 has a seat 18. An air valve 16 having a stem 35 bears against this seat. Compression spring 33 bearing against collar 34 on valve stem 35 biases the valve toward its closed position. An air line 15 extends from passage 21 in the body 22 to one end of the cylinder of pump 4.

An air check valve, generally called a snifter valve, 36, is placed in line 15 permitting air to flow into the pump but not out from the pump through line 15.

Figure 3:
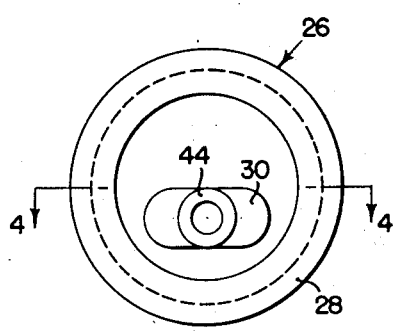
Fig. 3 is an end view of the flexible unit shown in Fig. 2.
Figure 4:
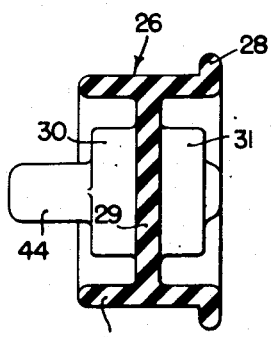
Fig. 4 is a horizontal section along line 4—4 in Fig. 3.

The grommet generally indicated at 26 is shown in Figs. 3 and 4 in its unstressed condition. This grommet has a cylindrical body 27 and a flange 28 adapted to bear against the seat 25. The grommet 26 has a web 29 extending across the annular flange 27. This web distorts under pressure as shown in Fig. 2. As shown in Figs. 3 and 4 a rib 30 extends part way across the chord between the anular walls 27 thus stiffening the central part of the web 29. A similar rib 31 may be applied to the other side of the web. The rib may also be extended in a cylindrical boss 44. The stem 40 extends through the rib 30 and boss 44 and is molded into the same. To increase the bond the portion 41 of the stem may be roughened. This stem 40 carries a float 42.

The valve stem 40 is molded into the grommet which is preferably made of a flexible material such as rubber and this is inserted into the body 22 after the valve 16 has been assembled in housing 22. Cement may be employed to secure a good seal between the cylindrical surface 24 of the body and the cylindrical outer surface 26 of the grommet. It will be noted that the flange 28 is at the upper or pressure end of the grommet so that the pressure of the water and air in the tank 3 tends to seat the flange. The metal retainer 49 is pushed down against the flange during assembly, the flange being pinched between the inner edge of the inclined seat 25 and the retainer. This further assures that there will be no leakage. After being forced into place the metal comprising the outer end of the body 22 is raised by a punch in the manner shown at 58 to prevent the release of the pressure upon the flange 28.

The assembly is such that the entire unit including the float 42 may be inserted through the wall of the tank 3.

In order to give the diaphragm 29 maximum flexibility and to still prevent the pressure inside of the receiver from distorting the diaphragm too much a rib 30 is provided. To prevent the stiffness of this rib from resisting the flexure in a vertical plane as seen in Fig. 2, this rib does not extend entirely across to the side walls as shown in Fig. 4.

A pressure actuated switch 60 is mounted on a pipe 61 connected to tank 3. When the pressure falls below a given value current is allowed to flow to motor 9 through wires 64. Pressure switches are customarily designated to open only upon the attainment of an appreciably higher pressure in space 2 than when the switch is closed.

Thus we have, in normal operation, beginning with the tank filled to the level shown in Fig. 1 and the motor shut off, a gradual lowering of the water level in the tank 2 as water is drained off through pipe 7. As the air in space 2 expands, its pressure drops and the diaphragm 29, being exposed to less pressure, assumes a smaller curvature. Also the pressure switch 60 is thrown and the pump started. As water is delivered to the tank 2, the air in space 2 is compressed, the diaphragm 29 bulges again and finally the pressure switch 60 cuts out. Since air can only flow through line 15 when the water level exceeds that shown and the level shown is the one normally reached when the pump is about to cut out, it is clear that any deficiency of air is made up only when the float is up and the pressure high. At the time when the end 45 of the rod 40 is to be depressed the diaphragm will always be increasing its bulge. If the rod 40 is located below the center of the diaphragm this will cause the rib 30 to tilt counterclockwise in Fig. 2 and thereby assist the float.

To insure a tight seal between the flange 28 of the grommet and the body 22 the seat 25 may be modified in the manner shown in Fig. 5. Here the inner edge of the seat carries a bead or raised flange 37. When the grommet is assembled in the body this bead presses into the flange 28 and thus assures a still tighter seal against leakage around the grommet than would otherwise be secured.

What I claim is:
1. A unitary flexible body having a tubular shell, a diaphragm extending across said shell, a single outwardly extending annular flange on said tubular shell, a stiffening rib extending across one side of said diaphragm, and a passage extending through said diaphragm and rib.

2. A unitary flexible body having a tubular shell, a single outwardly extending annular flange on said tubular shell, a diaphragm extending across said shell, a stiffening rib formed on one face of the diaphragm on a chord of the diaphragm, and a passage extending through said diaphragm and rib.

3. In a unitary flexible body adapted to be collapsed while being inserted into a cylindrical opening, the combination including a cylindrical shell of flexible material, a diaphragm extending across said shell, a single outwardly extending distortable annular flange on said cylindrical shell, a relatively rigid rib integral with the diaphragm located on a chord to one side of the center of said flexible body, said rib and diaphragm having an aperture therethrough, and a rod extending through said aperture.

4. In an air volume regulator system having a tank with an opening in a wall thereof with an annular seat around the opening, the combination including a unitary flexible body mounted in said opening, said body having a cylindrical shell and a relatively thin diaphragm extending across said shell, a single outwardly extending annular flange on said shell engaging said annular seat, said diaphragm having a stiffening rib formed on one face on a chord of the diaphragm, said diaphragm and rib having a relatively small passage therethrough, an operating rod carried in said passage, and a retainer ring contacting said flange holding the same on said seat and said unitary flexible body in said opening.

5. In an air volume regulator system having a tank with an opening in a wall thereof, the combination including a housing insertable in said opening, said housing having an aperture therethrough with an annular seat around said aperture, a unitary flexible body mounted in said aperture, said body having a cylindrical shell and a relatively thin diaphragm extending across said shell, a single outwardly extending annular flange on said shell engaging said annular seat, said diaphragm having a stiffening rib formed on one face on a chord of the diaphragm, said diaphragm and rib having a relatively small passage therethrough, an operating rod carried in said passage, and a retainer ring contacting said flange and housing holding the flange on said seat and the flexible body in said housing.

AMBROSE E. LE VAN.

References Cited in the file of this patent
UNITED STATES PATENTS

| Number | Name | Date |
|---|---|---|
| 1,614,274 | Briegel | Jan. 11, 1927 |
| 1,928,443 | Archer et al. | Sept. 26, 1933 |
| 1,959,259 | Zerk | May 15, 1934 |
| 1,983,106 | Sundstrom | Dec. 4, 1934 |
| 2,004,417 | Penn | June 11, 1935 |
| 2,186,786 | Jensen | Jan. 9, 1940 |
| 2,362,456 | Alden | Nov. 14, 1944 |
| 2,365,649 | Shaw | Dec. 19, 1944 |
| 2,381,640 | Brandstrom | Aug. 7, 1945 |
| 2,426,701 | Miller | Sept. 2, 1947 |
| 2,462,023 | Johanson | Feb. 15, 1949 |
| 2,608,207 | Le Van | Aug. 26, 1952 |